US012526052B2

(12) United States Patent
Dominguez-Gonzalez et al.

(10) Patent No.: US 12,526,052 B2
(45) Date of Patent: Jan. 13, 2026

(54) DISCRETE OPTOELECTRONIC DEVICE FOR AN ACCESS OR END POINT OF AN OPTICAL WIRELESS NETWORK (71) Applicant: OLEDCOMM, Vélizy-Villacoublay (FR)

(72) Inventors: Carlos Usiel Dominguez-Gonzalez, Sèvres (FR); Bastien Bechadergue, Malakoff (FR); Clément Lartigue, Clamart (FR)

(73) Assignee: OLEDCOMM, Vélizy-Villacoublay (FR)

( * ) Notice: Subject to any disclaimer, the term of this patent is extended or adjusted under 35 U.S.C. 154(b) by 153 days.

(21) Appl. No.: 18/251,171

(22) PCT Filed: Oct. 29, 2021

(86) PCT No.: PCT/FR2021/051907
§ 371 (c)(1),
(2) Date: Apr. 28, 2023

(87) PCT Pub. No.: WO2022/090672
PCT Pub. Date: May 5, 2022

(65) Prior Publication Data
US 2023/0412273 A1 Dec. 21, 2023

(30) Foreign Application Priority Data
Oct. 30, 2020 (FR) .................................. 2011149

(51) Int. Cl.
H04B 10/40 (2013.01)
H04B 10/11 (2013.01)

(52) U.S. Cl.
CPC ............. H04B 10/40 (2013.01); H04B 10/11 (2013.01)

(58) Field of Classification Search
CPC ........ H04B 10/11; H04B 10/116; H04B 10/40
USPC ......................................................... 398/128
See application file for complete search history.

(56) References Cited

U.S. PATENT DOCUMENTS

| 6,466,041 | B1 | 10/2002 | Egerer et al. |
| 6,483,622 | B1 | 11/2002 | Motohashi |
| 6,756,578 | B1 * | 6/2004 | Kaiser ...................... H03F 3/08 |
| | | | 250/214 R |

(Continued)

OTHER PUBLICATIONS

International Search Report as issued in International Patent Application No. PCT/FR2021/051907, dated Feb. 21, 2022.

(Continued)

Primary Examiner — Dalzid E Singh
(74) Attorney, Agent, or Firm — Pillsbury Winthrop Shaw Pittman LLP (57) ABSTRACT An optoelectronic device equips an access point of an optical wireless communication system and includes a transmitting optoelectronic module converting a digital signal into a light signal to be transmitted, a receiving optoelectronic module converting a received light signal into a digital signal, a control module controlling the transmitting optoelectronic module and the receiving optoelectronic module, and a power supply module supplying the transmitting optoelectronic module with a current selected by the control module, and the receiving optoelectronic module and the control module with voltages selected by the control module.

14 Claims, 5 Drawing Sheets (56) References Cited

U.S. PATENT DOCUMENTS

| | | | | |
|---|---|---|---|---|
| 7,809,278 B2* | 10/2010 | Morris | ............... | H04B 10/116 |
| | | | | 398/131 |
| 8,503,886 B1* | 8/2013 | Gunasekara | ......... | H04B 10/116 |
| | | | | 398/118 |
| 10,693,557 B1* | 6/2020 | Ayotte | ............... | H04N 21/2146 |
| 2007/0058987 A1* | 3/2007 | Suzuki | ............... | H04B 10/116 |
| | | | | 398/183 |
| 2009/0160370 A1* | 6/2009 | Tai | ........................ | H05B 41/16 |
| | | | | 315/312 |
| 2009/0278479 A1* | 11/2009 | Platner | ............... | H05B 47/155 |
| | | | | 340/309.9 |
| 2013/0236183 A1* | 9/2013 | Chao | .................... | H04B 10/116 |
| | | | | 398/101 |
| 2014/0363169 A1* | 12/2014 | Conger | ............... | H04B 10/693 |
| | | | | 398/115 |
| 2015/0292942 A1* | 10/2015 | Veryeras | ............... | G01S 7/4861 |
| | | | | 250/214 A |
| 2016/0134370 A1* | 5/2016 | Huang | .................... | H02J 50/30 |
| | | | | 398/118 |

OTHER PUBLICATIONS

Fahs, B., et al., "A 12-m 2.5-GB/s Lighting Compatible Integrated Received for OOK Visible Light Communication Links," Journal of Lightwave Technology, vol. 34, No. 16, Aug. 2016, XP011618689, pp. 3768-3775.

EASii IC France, "KEREN: Analog Front end For High End LIFI Base Band Application," Jun. 2020, 17 pages.

* cited by examiner

DISCRETE OPTOELECTRONIC DEVICE FOR AN ACCESS OR END POINT OF AN OPTICAL WIRELESS NETWORK

CROSS-REFERENCE TO RELATED APPLICATIONS

This application is the U.S. National Stage of PCT/FR2021/051907, filed Oct. 29, 2021, which in turn claims priority to French patent application number 2011149 filed Oct. 30, 2020. The content of these applications are incorporated herein by reference in their entireties.

The present invention concerns an optoelectronic device intended to equip an access point or an end point of an optical wireless communication system of an optical wireless network.

Some optical wireless networks, possibly of the LiFi ("Light Fidelity") type, include at least one optical wireless communication (or OWC) system that allows communication devices (such as cell phones (possibly smartphones) or electronic tablets for instance) or computers, coupled to OWC interface equipment to communicate using light signals. For this purpose, an optical wireless communication system (or OWC system) comprises at least two points with generally overlapping coverage areas and coupled to a router (or switch), possibly of the PoE ("Power over Ethernet"—electric power supply using Ethernet cable) type. This router is coupled to a network controller which is itself coupled to at least one access network, possibly part of the OWC network and possibly wireless (e.g., WAN ("Wireless Access Network") type), in order to be able to exchange electrical signals (carrying information (or data)).

In this type of OWC network, an access point communicates (transmits/receives), by means of intensity modulated light signals, with an interface equipment coupled to a communication equipment present in its coverage area. Each access point is thus in charge of converting a digital data signal (modulated) supplied by a modem into a light signal (or optical signal) for optical wireless communication, and conversely of converting a light signal received from an OWC interface equipment (coupled to a communication equipment) into a digital data signal intended for the modem.

In order to perform its functions, each access point (or end point) generally includes:
  an Analog-to-Digital Conversion module (ADC) associated with a first current supplying source, controlled by a first control module, and responsible for converting a non-binary (or analog) signal intended for the modem into a digital (or binary) signal,
  a Digital-to-Analog Conversion module (DAC) responsible for converting a digital signal received from the modem into a non-binary (or analog) signal,
  a transmitting optoelectronic module comprising a second current supplying source, controlled by a second control module, and responsible for converting an analog signal into a light signal to be transmitted, and
  a receiving optoelectronic module comprising a third voltage supplying source and responsible for converting a light signal received from an interface equipment into a digital signal for the modem.

It should be noted that the set consisting of the analog/digital conversion module (ADC) and the Digital/Analog Conversion module (DAC), the first current supplying source, the first control module, the module for converting electrical signals into light signals and the module for converting light signals into electrical signals is often referred to as the "Analog Front-End" (AFE) device.

It should also be noted that when the analog signal supplied by the modem is binary, the digital/analog conversion module may not be used. This is particularly the case when the modulation provided by the modem is a pulsed modulation of the "On-Off Keying" (or OOK) type or of the "Pulse Position Modulation" (or PPM) type.

The access points presented above are notably described in the article by Bassem Fahs et al "A 12-m 2.5-Gbs Lighting Compatible Integrated Rec" (Journal of Lightwave Technology, Vol. 34, No. 16, Aug. 15, 2016) and the commercial description by EASii IC France "KEREN: Analog Front end For High End LIFI Base Band Application" (June 2020).

A main drawback of the access points described above is that they are built from on sale electronic modules that have not been, a priori, designed to work together in an OWC application. This results in sub-optimal performance, high power consumption, a significant bulk, and an additional cost.

Moreover, since Optical Wireless Communication (or OWC) systems are designed on a case-by-case basis, once they are set up, they are not scalable.

It may thus be desired to provide an optoelectronic device which allows to overcome at least part of the above-mentioned drawbacks.

For this purpose, an optoelectronic device is proposed, on one hand, intended to be part of an access point or an end point of an optical wireless communication system, and, on the other hand, comprising:
  a transmitting optoelectronic module capable of converting a digital signal into a light signal to be transmitted, and
  a receiving optoelectronic module capable of converting a received light signal into a digital signal.

This optoelectronic device is characterized by the fact that it further comprises:
  a control module controlling the transmitting optoelectronic module and receiving optoelectronic module, and
  a power supply module supplying the transmitting optoelectronic module with current selected by the control module, and the receiving optoelectronic module and the control module with voltages selected by the control module.

Thus, an optoelectronic device is provided comprising a single power supply module common to the other modules and a single control module common to the transmitting optoelectronic module and the receiving optoelectronic module, and thus having optimal performance and reduced energy consumption, bulk and cost.

The optoelectronic device according to the invention may comprise other features that may be taken separately or in combination, including:
  its control module can comprise, on the one hand, a transformer ensuring a conversion of the analog signal received in a differential form into a single first intermediate signal, on the other hand, a first group of passive components carrying out a pre-equalization of the first intermediate signal in order to deliver a second intermediate signal, on the third hand, a first amplifier amplifying the second intermediate signal received on a first input in order to deliver a third intermediate signal on an output and, on the fourth hand, a transistor comprising a gate receiving the third intermediate signal and a drain connected to the transmitting optoelectronic module, the latter being biased by a voltage supplied by the power supply module and defining a mean bias current level and having a current flowing through it with fluctuations between minimum and maximum values induced by fluctuations of the third intermediate signal;

in the presence of the preceding option, its control module may comprise a feedback loop comprising a second amplifier having a first input coupled to a source of the transistor, a second input, and an output coupled to this second input via a second group of passive components and to a second input of the first amplifier, so that the current flowing through the transmitting optoelectronic module has a shape similar to a shape of the second intermediate signal;

in the presence of the previous sub-option, the second group of passive components may comprise an inductive component introducing an increase in bandwidth to an image signal of the current flowing through the transmitting optoelectronic module and/or a capacitive component inducing another pre-equalization;

in the presence of the first option, the control module may comprise a low-dropout voltage regulator producing from a control signal, having states defining instants during which the transmitting optoelectronic module must operate or not operate, a voltage biasing the first input of the first amplifier. Alternatively, it may comprise a transistor having a source receiving a control signal, having states defining instants during which the transmitting optoelectronic module must operate or not operate, and acting as an open or closed switch according to the state that is defined by the received control signal;

its receiving optoelectronic module may include at least one photoreceiver delivering a first current representative of the received light signal. In this case, its control module may include a first operational amplifier configured as a trans-impedance amplifier to convert the first current, received on a first input via a third group of active and passive components responsible for reducing a capacitance value felt by its first input, into a voltage delivered on an output thanks to a feedback loop coupling this first input to this output. Alternatively, its receiving optoelectronic module may comprise a photoreceiver delivering a first current representative of the received light signal, and its control module may comprise a first operational amplifier configured as a trans-impedance amplifier to convert this first current, received on a first input via a transistor having a gate and belonging to a fourth group of active and passive components responsible for reducing a capacitance value of the photoreceiver felt by its first input, into a voltage delivered on an output by means of a feedback loop coupling this output to the gate of the transistor;

it may comprise a digital/analog conversion module suitable for converting a received digital signal into a non-binary analog signal intended for the transmitting optoelectronic module, and an analog/digital conversion module suitable for converting a non-binary analog signal supplied by the receiving optoelectronic module into a digital signal. In this case, its power supply module supplies power to its digital/analog conversion module and its analog/digital conversion module;

its transmitting optoelectronic module may comprise at least one optical element ensuring a selected shaping of the light signal before transmission and/or its receiving optoelectronic module may comprise at least one optical element suitable for collecting the light signal in a selected way before it is converted into current;

its transmitting optoelectronic module may comprise at least one light source comprising at least one Light Emitting Diode (or LED) or at least one laser diode or at least one diode with Vertical Cavity Surface-Emitting Laser (or VCSEL);

its receiving optoelectronic module may comprise at least one photoreceiver comprising at least one photodiode or at least one avalanche photodiode or at least one Single-Photon Avalanche Diode (or SPAD);

it may comprise a first optical filter associated with the transmitting optoelectronic module and responsible for letting through light signals delivered by the latter and having a selected wavelength, and/or a second optical filter associated with the receiving optoelectronic module and responsible for letting through to the latter light signals having a selected wavelength;

it may comprise a modem suitable to convert each received modulated analog data signal into a digital data signal, and to convert each modulated analog data signal into digital data.

The invention further proposes an access point or an end point intended to be part of an optical wireless communication system and comprising at least one optoelectronic device of the type presented above.

When the (each) optoelectronic device does not include a modem, the access point or end point may include at least one modem suitable for converting received digital data into a modulated digital data signal for the (a) optoelectronic device and for converting a modulated digital data signal from the (a) optoelectronic device into digital data.

For example, this access point or end point may comprise, on the one hand, N optoelectronic devices respectively associated with N different wavelengths, with N≥2, and, on the other hand, a router coupled to the N optoelectronic devices and in charge of selectively feeding the latter according to instructions received.

The invention further proposes an optical wireless communication system intended to be part of an optical wireless network and comprising at least one access point or end point of the type presented above.

For example, this optical wireless communication system may comprise, on the one hand, N access or end points of the type presented above (but without a router), associated respectively with N different wavelengths, with N≥2, and, on the other hand, a router coupled to these N access or end points.

The invention will be better understood with the aid of the following description, given solely by way of example and made with reference to the appended drawings wherein.

In particular, a purpose of the invention is to propose an optoelectronic device 1 intended to be part of an access point or end point APn (n=1 to N), itself intended to be part of an optical wireless communication system 2 of an optical wireless network 3.

Figure 1:
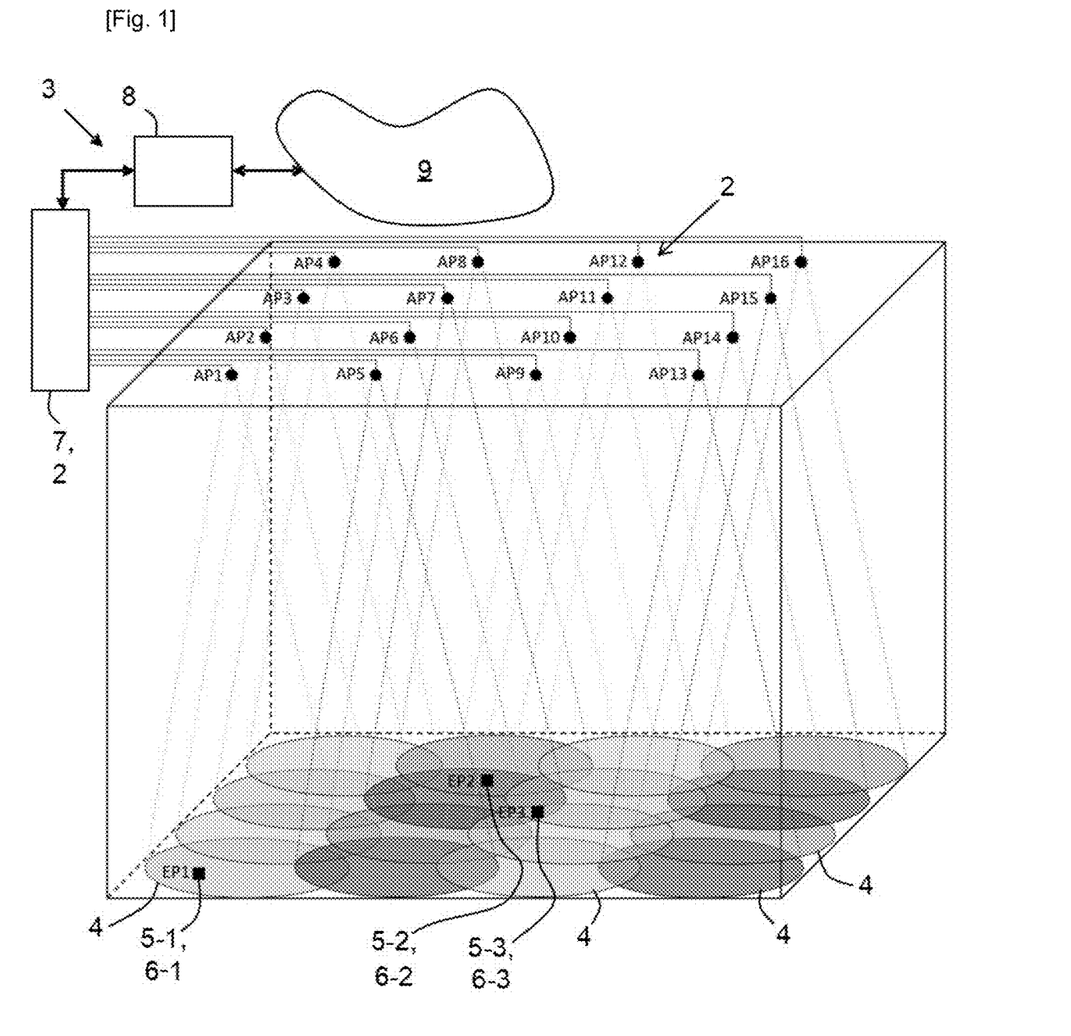
FIG. 1 illustrates diagrammatically and functionally an example embodiment of an optical wireless network.

An example of an optical wireless network 3 (hereafter referred to simply as a network) is diagrammatically and functionally represented in FIG. 1. This network 3 comprises here, in an non limitative way, an optical wireless communication system 2 comprising a router 7 coupled to sixteen access points APn (n=1 to 16) each having a coverage area 4 and each arranged to communicate with several interface equipment which are respectively coupled to several communication equipment 6-$k$ (possibly portable or mobile). In FIG. 1, each reference EPk (here k=1 to 3) designates an equipment comprising a communication equipment 6-$k$ to which is coupled an interface equipment 5-$k$.

Each access point APn operates in transmission and reception. In transmission, an access point APn is in charge of transforming electrical signals carrying information (or data), which it has received from the router 7, into intensity-modulated light signals to carry this same information (or data) and which it transmits in its coverage area 4 to at least one interface equipment 5-$k$. In reception, an access point APn is in charge of transforming light signals, intensity-modulated (to carry information (or data)) and that it received from an interface equipment 5-$k$, into electrical signals carrying the same information (or data) and that it transmits to the router 7.

As non-exhaustively illustrated in FIG. 1, all access points APn can, for example, be attached (directly or indirectly) to the ceiling (or sub-ceiling) of at least one room.

Also, as non-exhaustively illustrated in FIG. 1, all the access points APn can be coupled to the same router 7 with which they exchange electrical signals (carrying information (or data)). However, this is not mandatory, as a network 3 may include several routers 7. In fact, an optical wireless communication system 2 may comprise a router 7 coupled to N access points APn, with N≥2, or N access points APn coupled to at least one router in its network 3, or an access point APn of an optical wireless communication system 2 may comprise N optoelectronic devices 1 respectively associated with N different wavelengths, with N≥2, and a router coupled to the N optoelectronic devices 1 and in charge of selectively feeding the latter (1) according to received instructions.

The router 7 can, for example, be of the PoE type ("Power over Ethernet"—electrical power supply using Ethernet cable). Moreover, this router 7 is coupled to a network controller 8 which is itself coupled to an access network 9, possibly wireless (for example of the WAN ("Wireless Access Network") type). Thus, the router 7 can exchange electrical signals (carrying information (or data)) with at least one access network 9. This access network 9 is possibly part of the network 3. But this is not mandatory because it could be part of an external network to which the network 3 is coupled.

Like an access point (or end point) APn, each interface equipment 5-$k$ operates in transmission and reception. In transmission, an interface equipment 5-$k$ is responsible for transforming electrical signals carrying information (or data), which it has received from the communication equipment 6-$k$ to which it is coupled, into intensity-modulated light signals to carry the same information (or data) and which it transmits to the access point APn to which it is temporarily coupled. In reception, an interface equipment 5-$k$ is in charge of transforming light signals, intensity-modulated (to carry information (or data)) and which it has received from an access point APn, into electrical signals carrying the same information (or data) and which it transmits to the communication equipment 6-$k$ to which it is coupled.

For example, an interface equipment 5-$k$ can be an accessory (or dongle).

Also, for example, a communication equipment 6-$k$ can be a cell phone (possibly a smartphone) or an electronic tablet or a computer or a communicating game console.

It should be noted that in the example illustrated non-limitingly in FIG. 1, the optical wireless communication system 2 comprises sixteen access points APn (N=16), but it can comprise any number N of access points APn, as long as this number N is at least equal to one.

In the following, the network 3 is considered to be of the LiFi type. But the invention is not limited to this type of optical wireless network. Indeed, it concerns any type of optical wireless network.

Figure 2:
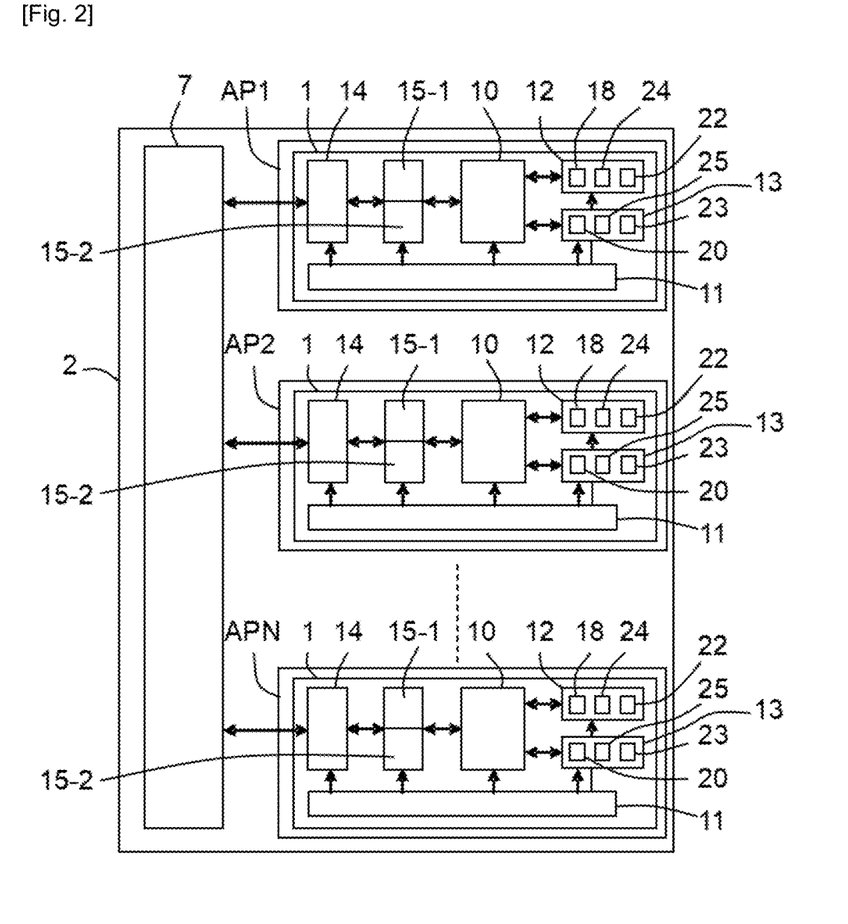
FIG. 2 illustrates diagrammatically and functionally an example embodiment of an optical wireless communication system according to the invention, intended to form part of an optical wireless network and comprising N access points each comprising an example embodiment of an optoelectronic device according to the invention.

As illustrated non-limitingly in FIG. 2, an optoelectronic device 1, according to the invention, comprises at least a control module 10, a power supply module 11, a transmitting optoelectronic module 12 and a receiving optoelectronic module 13. Preferably, it also comprises a modem 14 described below.

The transmitting optoelectronic module 12 is adapted to convert a digital (or binary) signal into a light signal (modulated in intensity) to be transmitted towards an interface equipment 5-$k$ coupled to a communication equipment 6-$k$.

This transmitting optoelectronic module 12 includes at least one light source 18 which may, for example, include at least one Light Emitting Diode (or LED) or at least one laser diode or at least one Vertical Cavity Surface-Emitting Laser (or VCSEL) diode.

The digital signal (received by the transmitting optoelectronic module 12) results from a modulation of digital data coming from the router 7 by a modem 14 (which is possibly part of the optoelectronic device 1, as in the example illustrated non-limitingly in FIG. 2). It therefore comes either directly from a modem 14, or from a Digital/Analog Conversion module (or DAC) 15-1 which is part of the optoelectronic device 1 and coupled to the modem 14. This depends indeed on the type of modulation which is performed by the modem 14. Indeed, if the signal supplied by the modem 14 is binary (and therefore a digital signal), such as when the modulation is a pulsed modulation of the "On-Off Keying (or OOK)" or "Pulse Position Modulation (or PPM)" type, the digital/analog conversion module 15-1 may not be used. On the other hand, if the signal supplied by the modem 14 is not binary (and is therefore an analog signal), such as when the modulation is OFDM (for "Orthogonal Frequency-Division Multiplexing"—digital signal encoding on multiple orthogonal frequencies), the digital/analog conversion module 15-1 must be used to convert the received digital signal into a non-binary (or analog) signal intended for the transmitting optoelectronic module 12. For the reverse direction, an Analog/Digital Conversion module (or ADC) (also part of the optoelectronic device 1 and coupled to the modem 14) is provided for converting a non-binary (analog) signal supplied by the receiving optoelectronic module 13 into a digital signal for the modem 14.

In the following, it is considered, as an illustrative example, that the modem 14 performs an OFDM type modulation. It is recalled that an OFDM signal coming from a modem 14 varies around a mean value, between a minimum value and a maximum value. This OFDM signal coming from the modem 14 must be converted into an analog signal, then into a light signal by the light source 18 (in transmission). The latter (18) has its own characteristics. In particular, it has an optical current/power characteristic that defines the optical power emitted as a function of the current supplied, and a limited modulation bandwidth (generally defined at −3 dB or −6 dB). In order to transmit an OFDM signal, its minimum value is usually set to a minimum current i_min and its maximum value to a maximum current i_max. In order to maximize the quality of the transmitted signal and thus that of the received signal, it is tried to maximize the difference i_max−i_min. Thus, the intermediate values of the OFDM signal correspond to currents whose variations are greater than if the difference i_max−i_min were small. It is therefore of interest to set the minimum current i_min as close as possible to 0, and the maximum current i_max as close as possible to the maximum current accepted by the light source 18.

In practice, the light source 18 may have a non-linear current-to-emitted optical power response. In other words, a linear change in drive current may lead to a nonlinear change in emitted optical power. i_min and i_max are therefore set to the limit values of the linearity range of the light source 18. However, this range may correspond to several hundred mA. Since the OFDM signal transformed into an electronic signal by the digital/analog conversion module 15-1 only reaches a few mA, the control module 10 will amplify this electronic signal at relatively high current levels while preserving its linearity, thanks to the invention (as will be seen later).

Furthermore, since the light source 18 has a specific modulation bandwidth, the higher this modulation bandwidth, the wider the OFDM communication channel can be, and therefore the higher the throughput can be, thanks to a pre-equalization technique (as will be discussed later).

The receiving optoelectronic module 13 is adapted to convert a received light signal into a digital signal intended for the modem 14, possibly via the analog/digital conversion module 15-2 when it must first be converted into a non-binary (or analog) signal.

This receiving optoelectronic module 13 comprises at least one photoreceiver 20 which may, for example, comprise at least one photodiode or at least one avalanche photodiode or at least one Single-Photon Avalanche Diode (or SPAD).

At the receiving end, after propagation in free space, an OFDM light signal is picked up by at least one photoreceiver 20 which converts it into a current (called photocurrent). As the free space communication distance increases, the received optical power (and thus the photocurrent) is lower. Typically, this photocurrent is of the order of a few μA to a few tens of μA. Consequently, the control module 10 will transform this photocurrent into a sufficiently high voltage to be processed by the modem 14 after the transformation into a digital signal carried out by the analog/digital conversion module 15-2 (as will be seen later). This amplification must however be carried out without adding distortions to the received signal in order to avoid degrading its quality.

Furthermore, the receiving chain has a specific bandwidth which is preferably at least equal to the bandwidth of the transmitting chain in order to ensure reception without frequency distortions. However, the photoreceivers 20 conventionally used have their own cut-off frequency and an internal capacity which, when it increases, reduces the total bandwidth of the reception chain. This internal capacity is proportional to the sensitive surface of the photoreceiver 20, which must be as large as possible (within the mechanical constraints of the design) in order to maximize the amount of light collected. The control module 10 will therefore ensure both a good sensitivity and an important gain of the reception chain, while maintaining its bandwidth at a value at least equal to that of the transmission chain and limiting as much as possible the distortions and the introduction of parasitic noises (as we will see later).

The control module 10 is arranged to control the transmitting optoelectronic module 12 and the receiving optoelectronic module 13.

The power supply module 11 is arranged so as to supply the transmitting optoelectronic module 12 with a current selected by the control module 10, and the receiving optoelectronic module 13 and the control module 10 with voltages selected by the control module 10 (as well as the possible modem 14, digital/analog conversion module 15-1 and analog/digital conversion module 15-2).

An optoelectronic device 1 is now provided comprising a single power supply module 11 common to the other modules (10 and 12 to 15-1 and 15-2) and a single control module 10 common to the transmitting optoelectronic module 12 and receiving optoelectronic module 13. Such an optoelectronic device 1 is thus designed specifically to operate in an OWC application, which optimizes its performance, significantly reduces its power consumption, and significantly reduces its bulk and cost.

Figure 3:
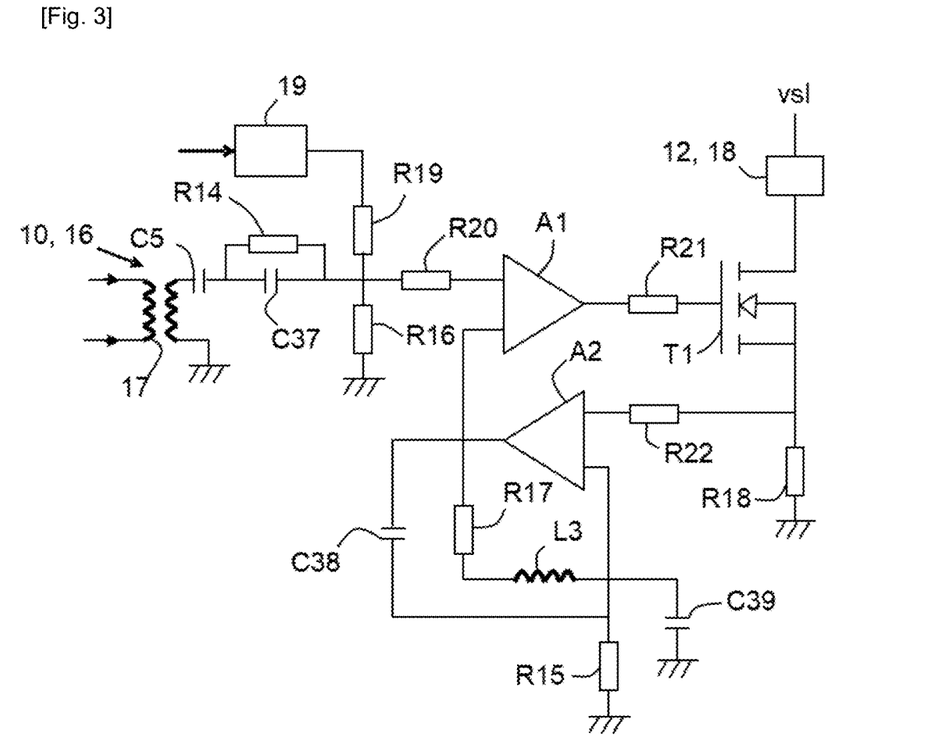
FIG. 3 illustrates diagrammatically an example embodiment of a first sub-section of a control module of an optoelectronic device according to the invention, dedicated to transmission.

For example, and as illustrated non-limitingly in FIG. 3, the control module 10 may comprise a first sub-section 16 dedicated to transmission and comprising a transformer 17, a first group of passive components (C5, R14 and C37), a first amplifier A1 and a transistor T1.

The transformer 17 converts the analog signal received in a differential form (here from the D/A conversion module 15-1 (because OFDM modulated)) into a first single (i.e., non-differential) intermediate signal.

The first group of passive components (C5, R14, and C37) is responsible for performing a pre-equalization of the first intermediate signal to provide a second intermediate signal (or pre-equalized first intermediate signal). This pre-equalization is intended to improve the bandwidth performance of the light source 18 of the transmitting optoelectronic module 12. For example, and as non-limitingly illustrated in FIG. 3, the first group of passive components may include a first capacitive component C5 (e.g., a capacitor), a resistive component R14 (e.g., a resistor) and a second capacitive component C37 (e.g., a capacitor).

The first amplifier A1 is in charge of amplifying the second intermediate signal that it receives on a first input in order to deliver on an output a third intermediate signal (or amplified second intermediate signal). This may be, for example, a current feedback amplifier. The first input of the first amplifier A1 is preferably its non-inverting (or +) input.

The first amplifier A1 also has a second input which is preferably its inverting (or –) input.

Transistor T1 comprises a gate that receives the third intermediate signal and a drain that is connected to the transmitting optoelectronic module 12. The third intermediate signal thus controls the gate of transistor T1, preferably via a resistive component R21 (for example, a resistor). In this case, the transmitting optoelectronic module 12 is biased by a voltage vs1 which is supplied by the power supply module 11 and which defines an average bias current level, and has a current flowing through it which fluctuates between minimum i_min and maximum i_max values induced by fluctuations of the third intermediate signal. The third intermediate signal sent to the gate of transistor T1 is thus a fluctuating signal, the amplitude of which must be as high as possible (within the limits of the capacities of the light source 18), and which will be reflected at the level of the current flowing through the light source 18 to cause it to fluctuate between i_min and i_max.

This transistor T1 can, for example, be a MOSFET ("Metal Oxide Semiconductor Field Effect Transistor" or more simply insulated gate field effect transistor).

In order to ensure a better linearity of the light signal transmitted by the light source 18, the control module 10 (and more specifically its first sub-section 16) can, as illustrated non-limitingly in FIG. 3, comprise a feedback loop comprising a second amplifier A2. This second amplifier A2 has a first input which is coupled to a source of transistor T1, a second input, and an output which is coupled to this second input via a second group of passive components (C38, R17, L3, R15, C39) and to the second input of the first amplifier A1. This allows the current flowing through the transmitting optoelectronic module 12 to have a shape that is similar to the shape of the second intermediate signal.

The first input of the second amplifier A2 is preferably its non-inverting (or +) input. It is preferably coupled to the source of transistor T1 via two resistive components R18 and R22 (for example, two resistors). The second input of the second amplifier A2 is preferably its inverting (or –) input.

This second amplifier A2 can, for example, be a current feedback amplifier, like the first amplifier A1.

For example, and as shown non-limitingly in FIG. 3, the second group of passive components (C38, R17, L3, R15, C39) may include an inductive component L3 (e.g., an inductor) that introduces a bandwidth increase (or "peaking") to an image signal of the current flowing through the transmitting optoelectronic module 12.

Also, for example, and as illustrated non-limitingly in FIG. 3, the second group of passive components (C38, R17, L3, R15, C39) may include a capacitive component C39 (e.g., a capacitor) inducing a further pre-equalization. The latter serves to attenuate the high frequencies at the feedback of the first amplifier A1, and consequently to induce an over-amplification of the high frequencies at the gate of transistor T1.

It can be noted, as illustrated non-limitingly in FIG. 3, that the second group of passive components (C38, R17, L3, R15, C39) can also include a capacitive component C38 (e.g. a capacitor) and two resistive components R17 and R15 (e.g. resistors) used to increase the bandwidth (peaking).

It should also be noted that the control module 10 (and more specifically its first sub-section 16) can, as illustrated non-limitingly in FIG. 3, comprise a low-dropout voltage regulator 19 producing, from a control signal, a voltage biasing the first input of the first amplifier A1. This control signal has states defining the instants during which the transmitting optoelectronic module 12 must operate (to transmit data within light signals) or not operate (to transmit nothing). For example, this control signal comes from the modem 14.

Thanks to the arrangement illustrated in FIG. 3, the first amplifier A1, which aims to ensure that the difference between its first and second differential inputs is as small as possible, acts so that the current flowing through the light source 18 has a shape as close as possible to the shape of the second intermediate signal, in order to ensure better linearity of the light signal transmitted by the light source 18.

Figure 4:
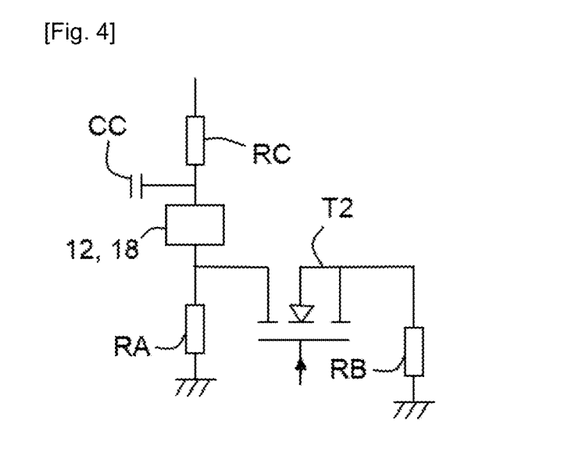
FIG. 4 illustrates diagrammatically an example embodiment of a first variant of a part of the first sub-section of the control module of FIG. 3.

Instead of using a low-dropout voltage regulator 19, it is possible, for example and as illustrated non-limitingly in FIG. 4, to use a transistor T2 having a source receiving the aforementioned control signal (for example from the modem 14), and acting as an open or closed switch (on the light source 18) according to the state which is defined by this received control signal. This transistor T2 can, for example, be a MOSFET. In this example, an injection T (or "bias tee"), comprising a resistive component RC and a capacitive component CC, is used to inject the current. The resistor RA has a very high value (typically of the order of a few tens of kohm), and the resistor RB has a low value (typically close to 1 ohm). If transistor T2 is open, a very low current (close to 0) flows through the light source 18 due to the resistor RA. On the contrary, if transistor T2 is closed, a high operating current flows through the light source 18 due to the resistor RB. Therefore, in the first case (T2 open) the light source 18 is deactivated and in the second case (T2 closed) the light source 18 is activated.

Figure 5:
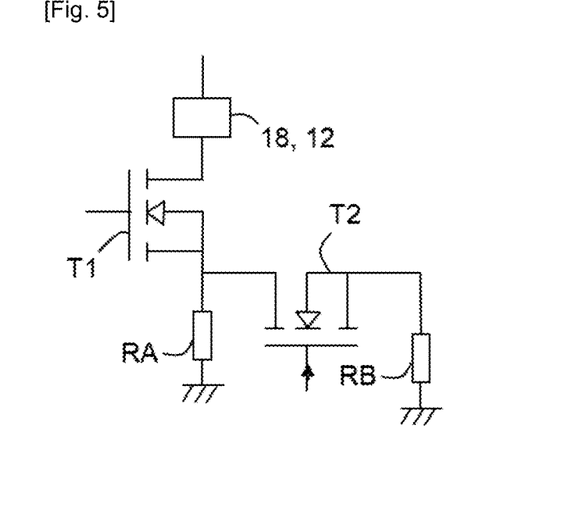
FIG. 5 illustrates diagrammatically an example embodiment of a second variant of a part of the first sub-section of the control module of FIG. 3.

In another embodiment illustrated non-limitingly in FIG. 5, the resistor RA has a very high value (typically of the order of a few tens of kohm), and the resistor RB has a low value (typically close to 1 ohm). If transistor T2 is open, a very low current (close to 0) flows through the light source 18 due to the resistor RA. On the contrary, if transistor T2 is closed, a high operating current flows through the light source 18 due to the resistor RB. Therefore, in the first case (T2 open) the light source 18 is deactivated and in the second case (T2 closed) the light source 18 is activated.

Figure 6:
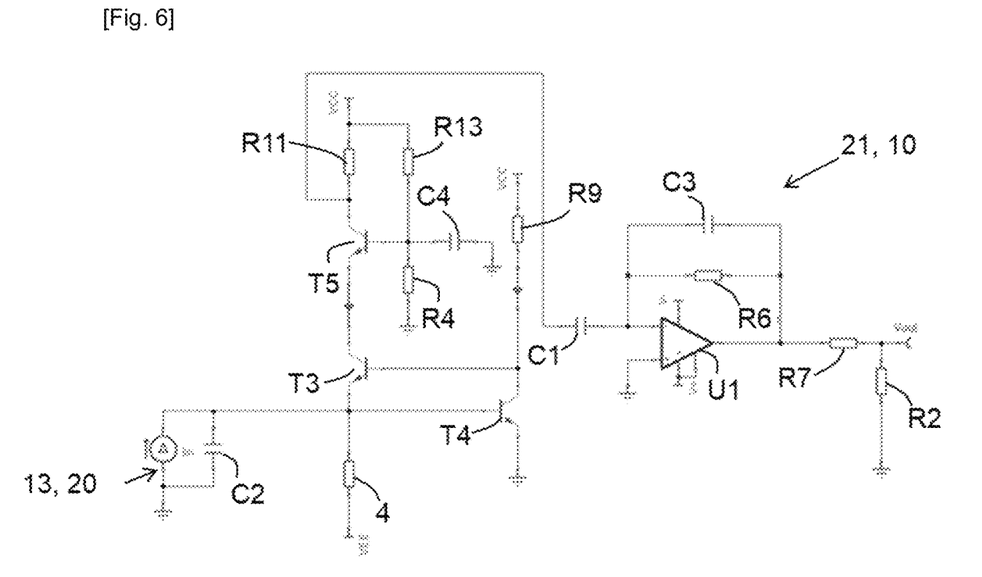
FIG. 6 illustrates diagrammatically an example embodiment of a second sub-section of a control module of an optoelectronic device according to the invention, dedicated to reception.

It should be noted, as illustrated non-limitingly in FIG. 6, that the receiving optoelectronic module 13 may comprise a photoreceiver 20 delivering a first current representative of the received light signal (from an interface equipment 5-$k$ coupled to a communication equipment 6-$k$). The photoreceiver 20 is here represented by a current source connected in parallel with a capacitive component C2 (e.g., a capacitor) having a selected capacitance value. In this case, the control module 10 may comprise a second sub-section 21 dedicated to reception and comprising a first operational amplifier U1 comprising first and second inputs and an output. The first input of the first operational amplifier U1 is preferably its inverting (or –) input. The second input of the first operational amplifier U1 is preferably its non-inverting (or +) input.

This first operational amplifier U1 is configured as a Trans-Impedance Amplifier (or TIA) to convert the first current, received on its first input via a third group of active and passive components, into a voltage delivered on an output thanks to a feedback loop (R6, C3) coupling its output to its first input. The third group of active and passive components is responsible here for reducing the capacitance value of the capacitive component C2 which is felt by the first input of the first operational amplifier U1.

For example, the feedback loop (R6, C3) may comprise a resistive feedback component R6 (e.g., a resistor) for converting the current injected at the first input into a voltage and connected in parallel with a capacitive feedback component C3 (e.g., a capacitor) that ensures the stability of the first operational amplifier U1.

Figure 7:
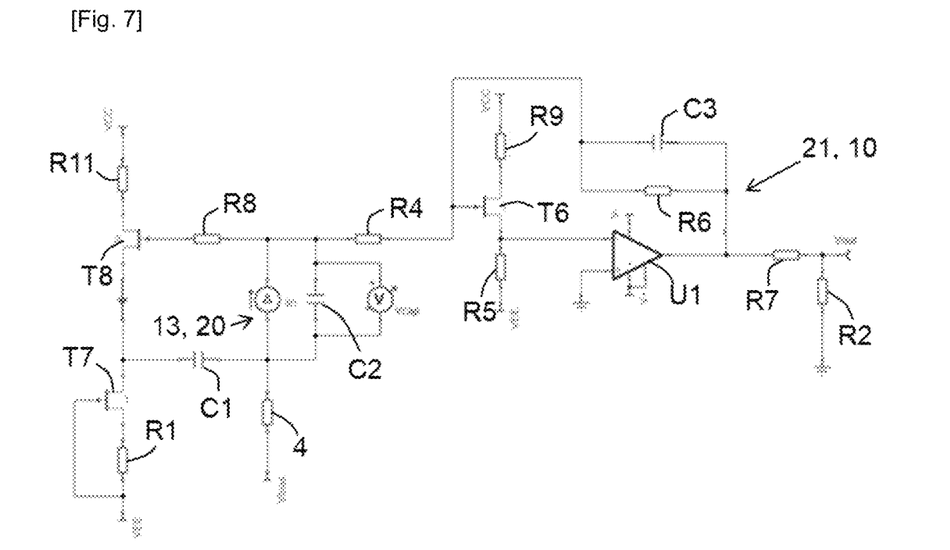
FIG. 7 illustrates diagrammatically an example embodiment of a variant of second sub-section of a control module of an optoelectronic device according to the invention, dedicated to reception.

In an alternative embodiment illustrated non-limitingly in FIG. 7, the receiving optoelectronic module 13 always comprises a photoreceiver 20 delivering a first current representative of the received light signal (from an interface equipment 5-k coupled to a communication equipment 6-k). The photoreceiver 20 is here also represented by a current source connected in parallel with a capacitive component C2 (e.g., a capacitor) having a chosen capacitance value, and the control module 10 comprises a second sub-section 21 dedicated to reception and also comprising a first operational amplifier U1 comprising first and second inputs and an output. The first input of the first operational amplifier U1 is preferably its inverting (or −) input. The second input of the first operational amplifier U1 is preferably its non-inverting (or +) input.

The first operational amplifier U1 is configured as a Trans-Impedance Amplifier (or TIA) to convert the first current, received on its first input via a transistor T6 having a gate and belonging to a fourth group of active and passive components (T6, R5, R9), into a voltage delivered on its output thanks to a feedback loop (R6, C3) connecting this output to the gate of transistor T6. The fourth group of active and passive components (T6, R5, R9) is responsible for reducing the capacitance value of the capacitive component C2 which is felt by the first input of the first operational amplifier U1 via transistor T6. This arrangement improves the reception bandwidth. As illustrated, the fourth group of active and passive components (T6, R5, R9) may include two resistive components R5 and R9 (for example two resistors), in addition to the transistor T6. This configuration is called "bootstrap". The purpose of all the transistors T6, T7 and T8 is to reduce the capacitance seen by the first operational amplifier U1. This reduction is obtained by reducing (practically to 0) the AC component between the anode and the cathode of the photodiode. To do this, the transistor T8 injects on the cathode an image of the current generated by the photodiode at the anode.

As shown non-limitingly in FIG. 1, the transmitting optoelectronic module 12 may include at least one optical element 22 providing selected shaping of the light signal prior to transmission. For example, the shaping may be focusing or defocusing, as required.

Also, as non-limitingly illustrated in FIG. 1, the receiving optoelectronic module 13 may comprise at least one optical element 23 suitable for selectively collecting the light signal (transmitted by an interface equipment 5-k coupled to a communication equipment 6-k) before it is converted into a current by the photoreceiver 20. For example, the collection (or concentration) may be intended to increase the amount of light signal received and fed to the photoreceiver 20.

It should also be noted, as illustrated non-limitingly in FIG. 1, that the optoelectronic device 1 can comprise a first optical filter 24 associated with the transmitting optoelectronic module 12 and/or a second optical filter 25 associated with the receiving optoelectronic module 13. The first optical filter 24 is in charge of letting through light signals which are delivered by the transmitting optoelectronic module 12 and which have a chosen (central) wavelength. This can be used to limit the optical bandwidth of the light source 18 if the latter has too wide an optical spectrum. The second optical filter 25 is responsible for letting light signals that have a chosen (center) wavelength pass to the receiving optoelectronic module 13. In other words, the optoelectronic device 1 can provide wavelength filtration in transmission, for example in order to transmit only digital data that have been previously associated with a predefined wavelength, and/or can provide wavelength filtration in reception in order to process internally (to the router 7) only digital data that have been previously associated with a predefined wavelength.

This option advantageously allows wavelength multiplexing within the network 3, and thus allows N communication equipment 6-k associated with N different wavelengths to communicate in parallel either via a same Optical Wireless Communication system (or OWC) 2 comprising N access points AP1 to APN (respectively associated with the N different wavelengths) and its own router 7, as illustrated in FIG. 1, or via N access points AP1 to APN respectively associated to the N different wavelengths and coupled to at least one router of the network 3, or via an access point comprising N optoelectronic devices 1 respectively associated to the N different wavelengths and coupled to at least one router 7. For example, wavelength multiplexing can be WDM ("Wavelength Division Multiplexing"), and therefore can be used to divide a data stream into sub-streams that are each transmitted at a given wavelength and then reassembled after reception in order to reconstruct the initial stream, or to transmit different streams at different wavelengths. In any case, paralleling data streams associated with different wavelengths increases the throughput. Thus, it is possible to reach data rates that can be at least of the order of 1 Gbps at the level of each optoelectronic device 1 and thus for each wavelength. It can be understood that by varying the number N of optoelectronic devices 1, the total throughput of the Optical Wireless Communication system (or OWC) 2 can be varied. Great scalability is then provided.

It should be noted that in the example illustrated non-limitingly in FIG. 1, the first optical filter 24 is placed upstream of the optical element 22 (with respect to the data transmission direction). However, in a variant (not illustrated), the first optical filter 24 could be placed downstream of the optical element 22 (with respect to the data transmission direction).

It should also be noted that in the example illustrated non-limitingly in FIG. 1, the second optical filter 25 is placed downstream of the optical element 23 (with respect to the data transmission direction). But in a variant (not illustrated) the second optical filter 25 could be placed upstream of the optical element 23 (with respect to the data transmission direction).

It will also be noted that the first optical filter 24 may (or may not) be part of the transmitting optoelectronic module 12. Similarly, the second optical filter 25 may (or may not) be part of the receiving optoelectronic module 13.

It will also be noted that the optical element 22 may (or may not) be part of the transmitting optoelectronic module 12. Similarly, the optical element 23 may (or may not) be part of the receiving optoelectronic module 13.

It should also be noted that the second sub-section 21 of the control module 10 can be arranged to have a variable gain depending on the quality of the optical communication channel assessed by the modem 14. In this case, the modem 14 generates a command representative of this quality and transmits it to the second sub-section 21 via an interface so that it adapts the value of the gain of the receive amplification.

It should further be noted that the invention is not limited to the above-described embodiments. Indeed, it will appear to those skilled in the art that various modifications can be made to the above-described embodiments, in the light of the teaching that has just been disclosed to them. In the detailed presentation of the invention made above, the terms used should not be interpreted as limiting the invention to the embodiments set forth in the present description, but should be interpreted to include all equivalents the anticipation of which is within the reach of those skilled in the art by applying their general knowledge to the implementation of the teaching just disclosed to them.

The invention claimed is:

1. An optoelectronic device for an access point or an end point of an optical wireless communication system comprising:
    a transmitting optoelectronic module capable of converting a digital signal into a light signal to be transmitted,
    a receiving optoelectronic module capable of converting a received light signal into a digital signal,
    a control module controlling said transmitting optoelectronic module and receiving optoelectronic module, and
    a power supply module supplying said transmitting optoelectronic module with current selected by said control module, and said receiving optoelectronic module and said control module with voltages selected by said control module,
    wherein said control module comprises i) a transformer ensuring a conversion of an analog signal received in a differential form into a single first intermediate signal, ii) a first group of passive components carrying out a pre-equalization of said first intermediate signal in order to deliver a second intermediate signal, iii) a first amplifier amplifying said second intermediate signal received on a first input in order to deliver a third intermediate signal on an output, and iv) a transistor comprising a gate receiving said third intermediate signal and a drain connected to said transmitting optoelectronic module, the latter being biased by a voltage supplied by said power supply module and defining a mean bias current level and having a current flowing through it with fluctuations between minimum and maximum values induced by fluctuations of said third intermediate signal.

2. The device according to claim 1, wherein said control module comprises a feedback loop comprising a second amplifier having a first input coupled to a source of said transistor, a second input, and an output coupled to said second input via a second group of passive components and to a second input of said first amplifier, so that said current flowing through said transmitting optoelectronic module has a shape similar to a shape of said second intermediate signal.

3. The device according to claim 2, wherein said second group of passive components comprises an inductive component introducing an increase in bandwidth to an image signal of said current flowing through said transmitting optoelectronic module and/or a capacitive component inducing another pre-equalization.

4. The device according to claim 1, wherein said control module comprises a low-dropout voltage regulator producing from a control signal, having states defining instants during which said transmitting optoelectronic module must operate or not operate, a voltage biasing said first input of said first amplifier.

5. The device according to claim 1, wherein said control module comprises a transistor having a source receiving a control signal, having states defining instants during which said transmitting optoelectronic module must operate or not operate, and acting as an open or closed switch according to said state defined by said received control signal.

6. The device according to claim 1, wherein said receiving optoelectronic module comprises a photoreceiver delivering a first current representative of said received light signal, and wherein said control module comprises a first operational amplifier configured as a trans-impedance amplifier to convert said first current, received on a first input via a third group of active and passive components responsible for reducing a capacitance value felt by its first input, into a voltage delivered on an output by means of a feedback loop coupling said first input to said output.

7. The device according to claim 1, wherein said receiving optoelectronic module comprises a photoreceiver delivering a first current representative of said received light signal, and wherein said control module comprises a first operational amplifier configured as a trans-impedance amplifier to convert said first current, received on a first input via a transistor having a gate and belonging to a fourth group of active and passive components responsible for reducing a capacitance value of said photoreceiver felt by its first input, into a voltage delivered on an output thanks to a feedback loop coupling this output to said gate of the transistor.

8. The device according to claim 1, further comprising a digital/analog conversion module adapted to convert a received digital signal into a non-binary analog signal intended for said transmitting optoelectronic module, and an analog/digital conversion module adapted to convert a non-binary analog signal supplied by said receiving optoelectronic module into a digital signal, and wherein said power supply module supplies power to said digital/analog conversion module and said analog/digital conversion module.

9. The device according to claim 1, wherein said transmitting optoelectronic module comprises at least one optical element ensuring a selected shaping of said light signal before transmission and/or said receiving optoelectronic module comprises at least one optical element adapted to collect said light signal in a selected way before said light signal is converted into current.

10. The device according to claim 1, further comprising i) a first optical filter associated with said transmitting optoelectronic module and responsible for letting through light signals delivered by the latter and having a selected wavelength, and/or ii) a second optical filter associated with said receiving optoelectronic module and responsible for letting through to the latter light signals having a selected wavelength.

11. The device according to claim 1, further comprising a modem adapted to convert each received modulated analog data signal into a digital data signal, and to convert each modulated analog data signal into digital data.

12. An access or end point for an optical wireless communication system, comprising at least one optoelectronic device according to claim 1.

13. An optical wireless communication system for an optical wireless network, comprising at least one access or end point according to claim 12.

14. The system according to claim 13, comprising i) N access or end points associated respectively with N different wavelengths, with N≥2, and ii) a router coupled to said N access or end points.

* * * * *